No. 688,315. Patented Dec. 10, 1901.
W. A. KENDRICK.
YOLK SEPARATOR AND EGG OPENER.
(Application filed Apr. 1, 1901.)
(No Model.)
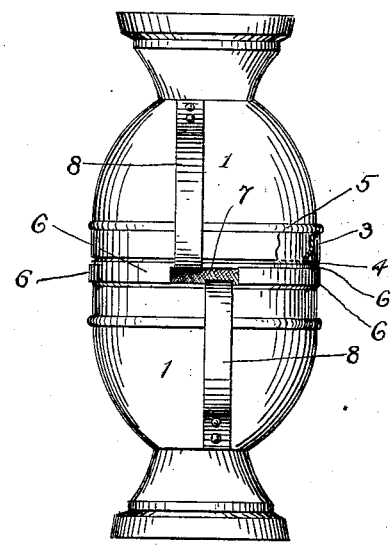
Fig. 1.
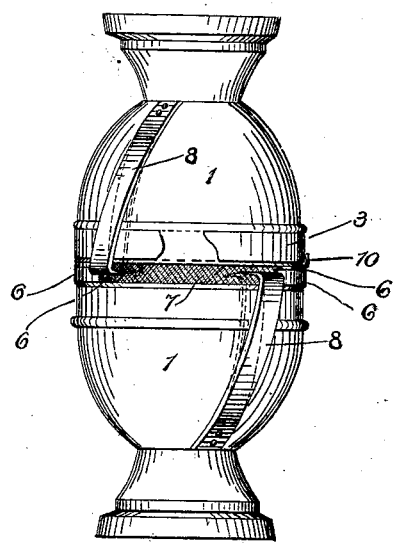
Fig. 2.
Fig. 3.
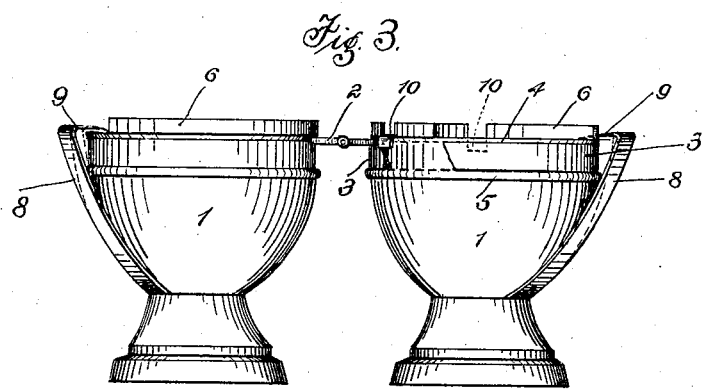
Fig. 5.
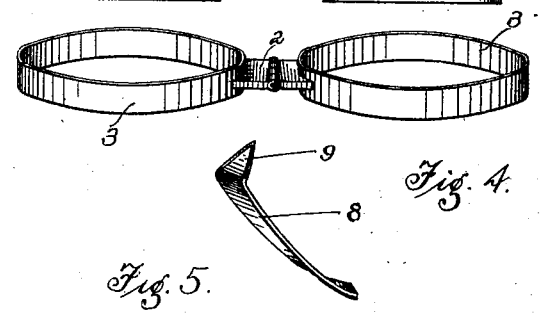
Fig. 4.
Witnesses
Inventor
William A. Kendrick
by
Attorney

UNITED STATES PATENT OFFICE.

WILLIAM A. KENDRICK, OF YALESVILLE, CONNECTICUT, ASSIGNOR OF ONE-HALF TO CHARLES MADEIRA, OF YALESVILLE, CONNECTICUT.

YOLK-SEPARATOR AND EGG-OPENER.

SPECIFICATION forming part of Letters Patent No. 688,315, dated December 10, 1901.

Application filed April 1, 1901. Serial No. 53,944. (No model.)

*To all whom it may concern:*

Be it known that I, WILLIAM A. KENDRICK, a citizen of the United States, residing at Yalesville, in the county of New Haven and State of Connecticut, have invented certain new and useful Improvements in Yolk-Separators and Egg-Openers; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to a yolk-separator and egg-opener; and it has for its object to provide a device in which the egg-shell can be formed with an elongated opening by turning one part of the device upon the other part thereof, so as to form a slit in the egg-shell, through which and an opening or slot in the device the white of the egg may pass out from the shell, retaining the yolk in the shell, and then by separating the two parts of the device the shell can be separated entirely around the circumference, thus allowing the yolk to be taken out of the shell.

The device is also adapted for use in breaking or severing the shell of boiled eggs by slitting the shell in the manner above indicated and then separating one part of the shell from the other by pulling apart or separating the two parts of the device.

To the accomplishment of the foregoing and such other objects as hereinafter appear the invention consists in the construction and in the combination of parts comprising two cup-shaped shells hinged and rotatably connected together, so that one part may be rotated relatively to the other and the parts then separated or opened by swinging upon the hinge, the cup-shaped portion being provided with a puncturing device adapted to form a slit in the egg-shell in rotating one member relatively to the other.

It further consists in features of construction and in the arrangement of parts, as will hereinafter be described and then sought to be particularly defined by the claims, reference being had to the accompanying drawings, forming a part hereof, and in which—

Figure 1 is a side elevation of the device, showing the parts in their normal position. Fig. 2 is a similar view showing the relative position of the parts with one cup-shaped member in the position which it bears after it has been rotated to form the slit in the shell. Fig. 3 is a side view showing the two cup-shaped members in their opened position. Fig. 4 is a perspective of two bands or rings and hinge that may be used to connect the cups together, and Fig. 5 is a perspective of one of the puncturing and slitting blades.

In the drawings the numeral 1 indicates two cup-shaped members stamped or spun or otherwise formed from metal or other material and connected together by a hinge 2, the hinge being connected with the two members in such manner that one member may rotate relatively to the other. This may be done in various ways. For instance, one leaf of the hinge may be connected to a ring or band (designated by the numeral 3 and illustrated as encircling one of the cups) and held rotatably in place by the beads 4 and 5, formed around the mouth of the cup, the other leaf of the hinge being connected directly to the opposite cup, as illustrated in Fig. 3 of the drawings, or said hinge may have each of its leaves connected to a band or ring 3, as indicated in Fig. 4 of the drawings, one band or ring for each cup, the band or ring of each cup being applied in the same manner as the ring indicated in Fig. 3 of the drawings, or the hinge may be otherwise connected, so as to permit one cup-shaped member to rotate relatively to the other.

Each cup-shaped member is provided at its edge or mouth with a flange 6, one being slightly larger in circumference than the other, so that when brought together one will lie inside of the other, and thus form a close joint between the two. A portion of each flange is cut away, so that when the two cut-away portions are brought into register with each other a slot 7 will be formed at the meeting edge of the two cup-shaped members, the length of said slot being greater or less, according to the extent of rotation of one member relatively to the other. For instance, when the two cup-shaped members are in their normal position the length of said slot will be substantially as illustrated in Fig. 1 of the drawings, and when one member has been rotated to its limit relatively to the other the length of said slot will be substantially as illustrated in Fig. 2 of the drawings. This slot when the parts are in the position illustrated in Fig. 2 of the drawings will permit the white of the egg to pass through the slot from the opening or slit made in the egg-shell by the puncturing and cutting blades.

For the purpose of puncturing and cutting the egg-shell a suitable blade is provided, and in practice it is preferred to use two such blades. These blades are designated by the numeral 8, one of them being attached in a suitable manner to each of the cup-shaped members, and each is provided with an inturned point 9, the edges of which may be beveled, so as to present a sharp cutting edge. These blades are of spring metal and normally stand out from the sides of the cup-shaped members, as indicated by full lines in the drawings, and are adapted to be pressed inwardly by the thumb of each hand into the position indicated by dotted lines, so as to pierce or puncture the egg-shell. When these blades are pressed inward with the cup-shaped members in the position shown in Fig. 1 of the drawings, they will puncture the egg-shell, and then by turning one member relatively to the other one blade will be moved away from the other—for instance, to the position illustrated in Fig. 2 of the drawings— the blade severing the egg-shell to the extent of movement made, and at the same time the slot 7 at the meeting edge of the two members is elongated from that shown in Fig. 1 to the extent shown in Fig. 2 of the drawings. Still holding the blades pressed inwardly and turning the cup-shaped members sidewise, the white of the egg will run out of the shell and through the slot 7. Now by throwing open the two cup-shaped members upon their connecting-hinge and still retaining the blades pressed inwardly the yolk of the egg may be discharged from the shell, the two parts of the shell being pulled apart in the opening of the cups and retained one part in each cup-shaped member by the inturned point of the cutting-blades, or if the egg happens to be a boiled egg the shell is broken and the parts separated in the manner described. When the egg-shells are to be removed from the cup-shaped members, the spring-blades spring outward on relieving the pressure of the thumbs thereon, and the shells can then be readily removed from the cup-shaped members.

For the purpose of limiting the rotation of one cup-shaped member relatively to the other I provide suitable stops 10, one on each side of the hinge 2, said stops being formed by cutting and turning down portions of the flange 6 at the mouth of one of the cup-shaped members, thus forming lips which may lap over the band or ring 3, as indicated in Fig. 3 of the drawings, and forming stops which, coming in contect with the hinge on one side or the other thereof, according to the direction thereof in which the rotation is made, will stop or limit the movement, and thus indicate the extent of movement both for the starting-point and for the stopping-point. Any other form of stop for the purpose, however, may be provided, or the stops may be omitted entirely, without departing from other features of the invention.

The device formed as specified is simple, strong and durable, efficient and at the same time graceful and ornamental, and can be used for opening either raw or boiled eggs, and will be found to be a most useful and serviceable article of tableware or for culinary purposes.

I have illustrated and described what I consider to be the preferred details of construction and arrangement of the several parts, but it is obvious that changes can be made in the several features specified and essential features of my invention still be retained.

Having described my invention and set forth its merits, what I claim is—

1. The within yolk-separator and egg-opener comprising two cup-shaped members hinged and rotatably connected together and provided with means for puncturing and severing an egg-shell, substantially as described.

2. The within yolk-separator and egg-opener comprising two cup-shaped members hinged and rotatably connected together, said members being formed with a slot at their meeting edges, and means for puncturing and severing an egg-shell, substantially as described.

3. The within yolk-separator and egg-opener comprising two cup-shaped members, a band or ring loosely encircling one of said members, so as to permit one member to be rotated relatively to the other, a hinge for uniting the two cup-shaped members, said hinge being connected with said ring or band, and means for puncturing and severing an egg-shell, substantially as described.

4. The within yolk-separator and egg-opener comprising two cup-shaped members hinged and rotatably connected together, said members being formed with a slot at their meeting edges, and spring-influenced cutting-blades attached one to each cup-shaped member and having an inturned point entering the slot between the cup-shaped members, substantially as described.

5. The within yolk-separator and egg-opener comprising two cup-shaped members hinged and rotatably connected together, stops for limiting the rotation of one member relatively to the other, and means for puncturing and severing an egg-shell, substantially as described.

In testimony whereof I affix my signature in presence of two witnesses.

WILLIAM A. KENDRICK.

Witnesses:
W. S. HOTCHKISS,
CURTIS A. DOOLITTLE.